Feb. 26, 1952 — H. M. WOOD — 2,587,264
FISH LURE
Filed Feb. 4, 1949
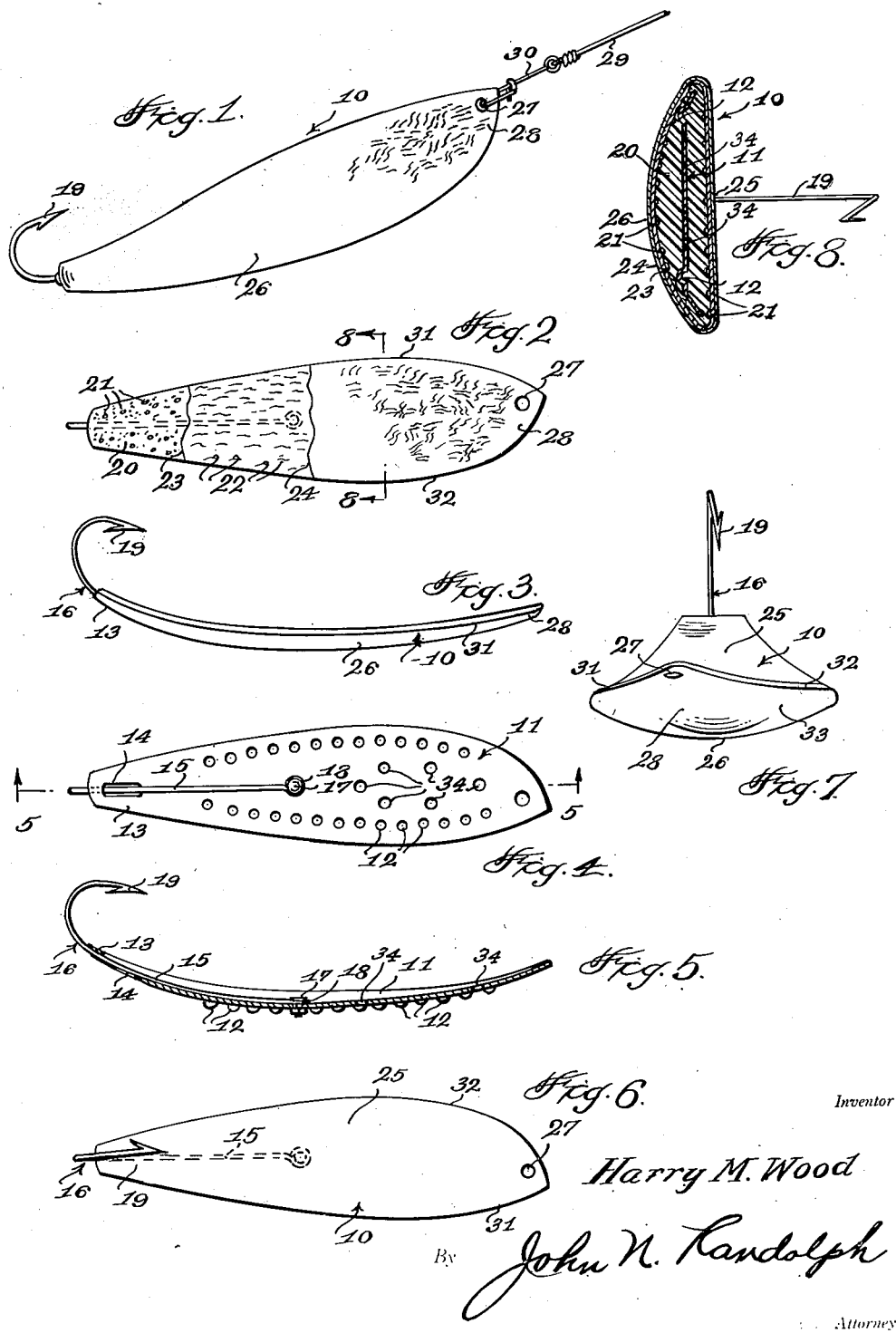
Inventor
Harry M. Wood
By John N. Randolph
Attorney Patented Feb. 26, 1952

2,587,264

UNITED STATES PATENT OFFICE 2,587,264

FISH LURE

Harry M. Wood, Washington, D. C.

Application February 4, 1949, Serial No. 74,579

2 Claims. (Cl. 43—42.33)

This invention relates to a novel construction of artificial fish lure of the spoon-type and has for its primary object to provide a lure body composed of a plurality of layers superimposed upon both sides of a base member to produce a body portion which, due to its appearance will readily attract fish and which, due to its construction, will very realistically simulate the movement of a bait fish such as a minnow when the lure is drawn through the water in either trolling or retrieving.

Another object of the invention is to provide a lure capable of being constructed in various sizes and which may be utilized effectively for still fishing by subjecting a line to which the lure is attached to an up and down motion in the water.

Another and particularly important object of the invention is to provide a lure which is so constructed that one side of the body portion thereof is substantially flat in cross section to minimize the tendency of the lure to revolve on its longitudinal axis when drawn through the water to therefore more realistically simulate the swimming action of a bait fish.

Another object of the invention is to provide a lure having an outer layer or coating of a transparent material which will resist scratching and disfiguration when the lure is employed for deep trolling over an oyster bottom.

Another object of the invention is to provide a lure body having a metal core or base which is longitudinally and transversely bowed to increase the strength thereof and which is provided with a novel means for flaring the side edges of the core or base and which affords an anchoring means for the base layer or coating.

Another object of the invention is to provide a lure body having a line attaching eye which is laterally offset with respect to the longitudinal axis of the lure to cause the lure to follow an irregular or zigzag course when drawn through the water.

Various other objects and advantages of the invention will hereinafter become more fully apparent from the following description of the drawing, illustrating a presently preferred embodiment thereof, and wherein:

Figure 1 is a perspective view looking generally toward the convex or under side of the lure;

Figure 2 is a bottom plan view, partly broken away, of the lure;

Figure 3 is a side elevational view of the artificial lure;

Figure 4 is a top plan view of the core or reinforcing member;

Figure 5 is a longitudinal, substantially central sectional view thereof taken substantially along a plane as indicated by the line 5—5 of Figure 4;

Figure 6 is a top plan view of the lure;

Figure 7 is a front elevational view thereof, on an enlarged scale, and

Figure 8 is an enlarged cross sectional view of the lure body taken substantially along a plane as indicated by the line 8—8 of Figure 2.

Referring more specifically to the drawing, the novel artificial fish lure comprising the invention is designated generally 10 and includes a reinforcing core or base 11 which is preferably formed of a strip of metal shaped to generally simulate a small bait fish such as a minnow and which is bowed longitudinally and transversely throughout its length, as best illustrated in Figures 3 and 5. The core or reinforcing member 11 is provided adjacent its longitudinal side edges with longitudinally spaced pressed out recesses or sockets 12 which project downwardly. The longitudinal side edges of the member 11 outwardly of the sockets or recesses 12 are flared upwardly, as best illustrated in Figure 8, so that the member 11 which is sufficiently thin to be relatively resilient will be sufficiently reinforced by being bowed longitudinally and transversely to prevent it from being bent readily to a degree so that it will not return by its own resiliency to its normal shape as illustrated in Figures 3, 4 and 5. The tapered rear end or tail portion 13 of the member 11 is provided with a longitudinally elongated opening 14 to receive a portion of the shank 15 of a fishhook, designated generally 16. Said hook shank 15 extends forwardly from the opening 14 along the upper side of the member 11 and is fastened thereto, intermediate of the side edges of the member 11 and slightly rearwardly of a point intermediate of the ends thereof by a screw and nut fastening 17 which extends through an eye 18 at the forward terminal of the shank 15 and through said reinforcing member 11. The portion of the hook shank 15 which extends rearwardly from the under side of the tail portion 13 is curved upwardly and forwardly therebeyond and terminates in a barb 19 which is disposed above the tail portion 13.

The core or reinforcing member 11 with the hook 16 applied thereto, as previously described, is first provided with a base layer or coating of plastic such as celluloid which is applied to both surfaces thereof in sufficient quantity so that the upper surface will be substantially flat in cross section, as seen in Figure 8 and the bottom surface substantially convex or outwardly arced in cross section. This base coating 20 of plastic is then subjected to heat to cause bubbles to form on the surface thereof, as seen at 21 in Figure 2 and which will remain just beneath the surface of the coating 20 when it has cooled and set. The surface of the coating 20 on both sides of the lure 10 then has coloring applied thereto as indicated at 22 and which may be a plurality of colors daubed or otherwise applied thereto. While the coloring 22 is still wet an intermediate coating 23 of ground white pearl in a paste or liquid form is applied over the base coating 20. Any suitable paste or liquid may be utilized as a carrier for the ground white pearl and which possesses sufficient adhesive characteristics to cause it to readily adhere to the base coating 20. Before the white pearl coating 23 is dried an outer coating 24 of a transparent plastic cement is applied completely thereover and the adhesive characteristics of the transparent plastic cement 24, in being applied over the coating 23, will exert a sufficient pull thereon to cause the coloring 22, which is still wet, to run or be smeared along the surface of the base coating 20 to produce a vari-colored rainbow effect or hue.

The lure body 10, as previously stated, is substantially flat in cross section on its upper side 25 and is convexly or outwardly arced in cross section on its underside 26. Said lure body 10 is likewise longitudinally bowed from end-to-end thereof and with its upper side constituting the concave side thereof and the underside 26 the convex side.

The lure body 10 is provided with a line or leader attaching opening 27 adjacent its forward end 28 and which is laterally offset with respect to its longitudinal axis, as best illustrated in Figure 2. A line or leader may be attached directly to the aperture 27 or the line or leader, as indicated at 29 in Figure 1 may be attached thereto by an attaching hook 30 of conventional construction. The longitudinal edges 31 and 32 of the lure body 10 are outwardly bowed and converge toward the tail or trailing end of the lure body so that the lure body is substantially narrower at its trailing end than at a point forwardly of its intermediate portion and thereafter decreases in width toward its leading end. The forward portion of the side edge 32 is curved to a greater degree than the forward portion of the side edge 31 and merges with said side edge 31 at one side of the center line of the lure body and substantially in front of the aperture 27. The portion of the lure body at the leading end thereof and adjacent the side edge 32 is flared upwardly to a greater extent than the portion of the forward end of the body located adjacent the edge 31 so that when the lure body is drawn through the water the tendency of the lure 10 to be caused to revolve in a clockwise direction on its longitudinal axis as seen in Figure 7 by the pull exerted thereon by the line or leader 29 will be offset by said aforementioned upwardly flared leading end portion 33 to thereby minimize or reduce the rotation of the lure 10 while being drawn through the water without, however, eliminating such rotation. The flat upper surface 25 in cross section also tends to minimize rotation of the lure body. The upwardly flared forward end portion 33 also causes the lure to swerve from side to side when drawn through the water to more realistically simulate the darting motion of a bait fish such as a minnow when being chased by a larger fish.

The depressions 12 in the core or reinforcing member 11 in addition to causing the side edge portions thereof to be flared upwardly and in addition to reinforcing said core 11 also affords anchoring recesses for the base coating of plastic 20 as clearly seen in Figure 8. The reinforcing member 11 is preferably provided with openings or apertures 34 in the forward half thereof through which portions of the base coating 20 extend, as seen in Figure 8, to provide additional anchoring means for the plastic composition.

The lure body 10 including the reinforcing member 11 and the coatings 20, 23 and 24 is relatively resilient. Furthermore, said coatings afford a very hard smooth finish which will readily slide off of obstructions on which most lures would be snagged and will effectively resist cutting or scratching when the lure is utilized for deep trolling over oyster beds or other rough bottoms and which ordinarily damage most lures to an extent to render them substantially useless.

The varied coloring 22 and the bubbles 21 are clearly visible through the coating 23 and the transparent coating 24 and the surface of the lure body 10 and the bubbles 21 will readily reflect light so that the lure when drawn through the water is extremely effective in attracting fish thereto.

Various modifications and changes are contemplated and may obviously be resorted to, without departing from the spirit or scope of the invention as hereinafter defined by the appended claims.

I claim as my invention:

1. A fish lure comprising an elongated reinforcing member of resilient metal, and a hook having a shank disposed longitudinally of the reinforcing member and secured thereto, said hook having a barbed end offset from and disposed adjacent one end of the reinforcing member; said reinforcing member having a plurality of layers of plastic material applied over both sides of and completely enclosing said reinforcing member and combining therewith to form the lure body, said lure body having an upper surface which defines a substantially straight line when intersected by a transverse plane normal to the longitudinal axis and said upper surface being longitudinally concavely arced and the under surface of the lure body being transversely and longitudinally arced outwardly, said layers including a relatively thick base coating of plastic, an intermediate layer of ground white pearl and an exterior layer of transparent plastic cement, the surface of said base layer being visible through the intermediate and outer layers and having light reflecting bubbles adjacent the surface thereof.

2. A fish lure comprising a reinforcing member, and a plurality of layers of a plastic material applied over said reinforcing member and combining therewith to form the lure body, said layers including a relatively thick base layer of plastic, an intermediate layer of ground white pearl and an exterior layer of transparent plastic cement, said base layer having light reflecting bubbles near the surface thereof visible through the intermediate and outer layers.

HARRY M. WOOD.

REFERENCES CITED

The following references are of record in the file of this patent:

UNITED STATES PATENTS

| Number | Name | Date |
|---|---|---|
| 468,361 | Pflueger | Feb. 9, 1892 |
| 697,910 | Wilson | Apr. 15, 1902 |
| 1,323,458 | Dills | Dec. 2, 1919 |
| 1,763,031 | Yates | June 10, 1930 |
| 1,772,058 | Welch | Aug. 5, 1930 |
| 1,803,056 | Davis | Apr. 23, 1931 |
| 2,116,994 | Bear | May 10, 1938 |
| 2,124,152 | Salm | July 19, 1938 |
| 2,149,464 | Potts | Mar. 7, 1939 |
| 2,311,985 | Heddon | Feb. 23, 1943 |

FOREIGN PATENTS

| Number | Country | Date |
|---|---|---|
| 21,391 | Australia | Feb. 16, 1935 |
| 84,351 | Sweden | July 18, 1935 |